United States Patent
Nakano et al.

(10) Patent No.: US 6,907,095 B1
(45) Date of Patent: Jun. 14, 2005

(54) CLOCK RIDE-OVER METHOD AND CIRCUIT

(75) Inventors: Fumio Nakano, Tokyo (JP); Hitoshi Fujita, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 716 days.

(21) Appl. No.: 09/709,203

(22) Filed: Nov. 9, 2000

(30) Foreign Application Priority Data

Nov. 11, 1999 (JP) .......................................... 11-321355

(51) Int. Cl.⁷ ................................................ H04L 7/04
(52) U.S. Cl. .................................................... 375/354
(58) Field of Search ................................ 375/354, 355, 375/377, 350, 143, 152, 371, 362, 373, 376, 326, 327, 343; 370/342, 335, 441, 350; 37/376

(56) References Cited

U.S. PATENT DOCUMENTS

| | | | | |
|---|---|---|---|---|
| 5,056,121 A | * | 10/1991 | Ohta et al. ................... | 375/118 |
| 5,259,004 A | * | 11/1993 | Nakayama ................... | 375/106 |
| 5,353,069 A | * | 10/1994 | Kobo et al. .................. | 348/611 |
| 5,455,840 A | * | 10/1995 | Nakauchi et al. ........... | 375/371 |
| 5,644,606 A | * | 7/1997 | Martinez et al. ............ | 375/376 |
| 5,859,671 A | * | 1/1999 | Kim ............................ | 348/537 |
| 5,886,946 A | * | 3/1999 | Ooishi ......................... | 365/233 |
| 5,930,697 A | * | 7/1999 | Bohme et al. ............... | 455/315 |
| 5,987,078 A | * | 11/1999 | Kiyanagi et al. ............ | 375/344 |
| 6,078,576 A | * | 6/2000 | Schilling et al. ............ | 370/347 |
| 6,163,585 A | * | 12/2000 | Yamawaki et al. ......... | 375/373 |
| 6,442,703 B1 | * | 8/2002 | Nakamura ................... | 713/500 |
| 6,526,106 B1 | * | 2/2003 | Migita ......................... | 375/354 |
| 6,603,829 B1 | * | 8/2003 | Glaser et al. ............... | 375/360 |
| 6,643,820 B2 | * | 11/2003 | Tomita ........................ | 714/798 |

FOREIGN PATENT DOCUMENTS

| | | | | |
|---|---|---|---|---|
| JP | 4-96535 | * | 3/1992 | ............. H04L/7/00 |
| JP | 08-213975 | | 8/1996 | |
| JP | 4-96535 | | 3/2000 | |

* cited by examiner

*Primary Examiner*—Mohammed Ghayour
*Assistant Examiner*—Dung X. Nguyen
(74) *Attorney, Agent, or Firm*—Katten Muchin Zavis Rosenman (57) ABSTRACT

A clock ride-over circuit in which clock ride-over may be achieved even if jitter is contained in clocks prior to and subsequent to ride-over and no control input signal for write and readout is applied from outside. A clock prior to rideover CLK_1 is detected by a clock subsequent to ride-over CLK_2 which is of a higher speed than the clock prior to ride-over. A timing signal TIM of a constant period, generated by a counter adapted for self-running with the clock prior to ride-over, is compared to the phase comparison signal COMP which is the result of the clock detection. Stable clock ride-over is possible by the phase comparison signal COMP having a pulse width larger than the jitter period of the clock subsequent to ride-over.

10 Claims, 10 Drawing Sheets

CLOCK RIDE-OVER METHOD AND CIRCUIT

FIELD OF THE INVENTION

This invention relates to a clock change-over (termed herein as "ride-over") circuit and, more particularly, to a circuit for making ride-over across jitter-containing clocks.

BACKGROUND OF THE INVENTION

Figure 7:
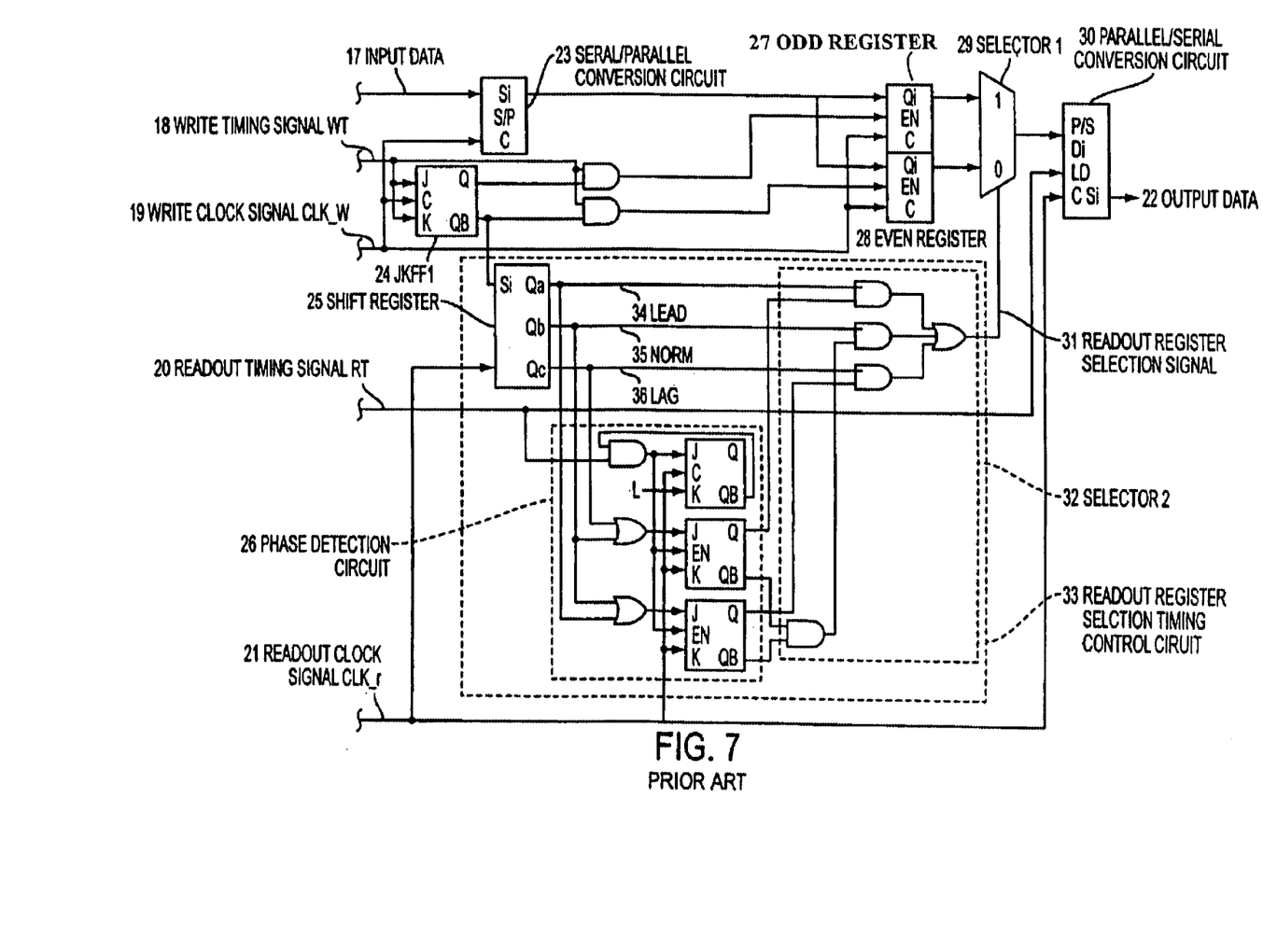
FIG. 7 is a circuit diagram showing the structure of a conventional clock ride-over circuit.
Figure 8:
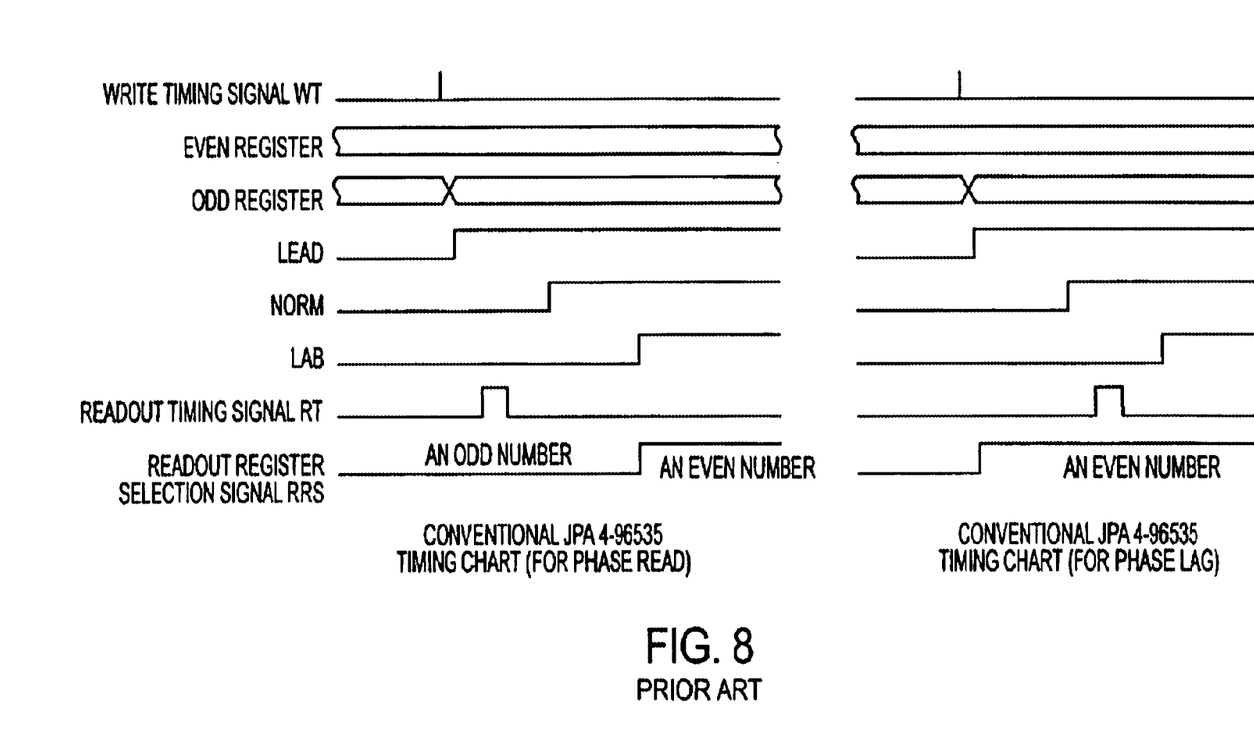
FIG. 8 is a timing chart of FIG. 7.
Figure 9:
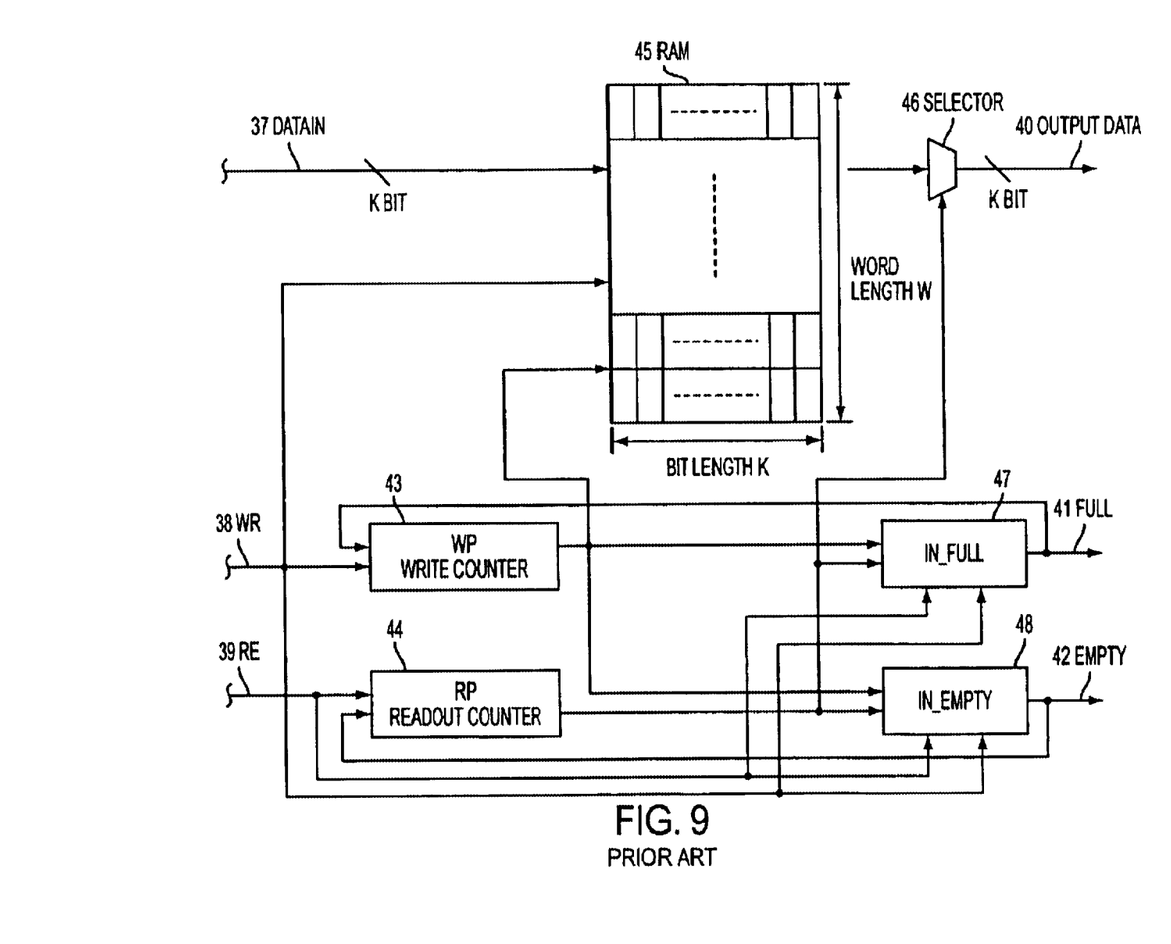
FIG. 9 is a circuit diagram showing the structure of another conventional clock ride-over circuit.
Figure 10:
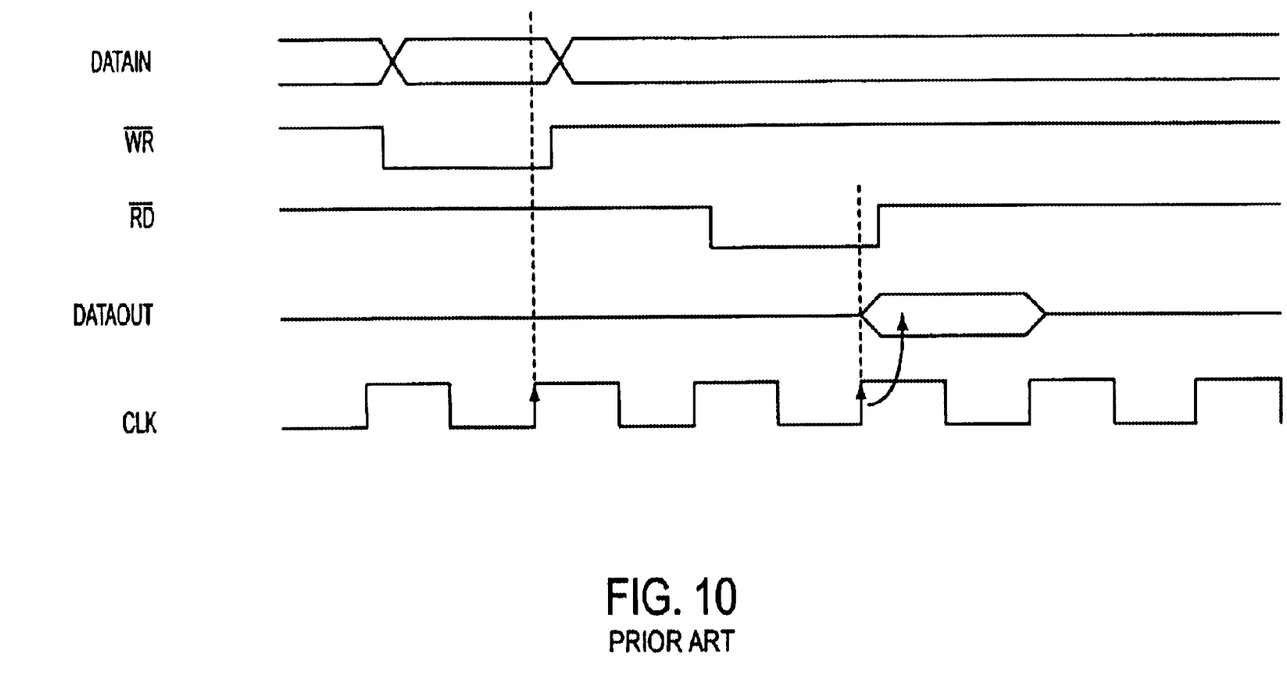
FIG. 10 is a timing chart of FIG. 9.

Among known clock ride-over circuits, there are a circuit described in Japanese Patent Kokai Publication JP-A-4-96535, as shown in FIG. 7 herein, and an FIFO employing a RAM of FIG. 9, as described in a publication by Y. Hasegawa entitled: "Introduction to Hardware Designing by VHDL". The entire disclosures of these publications are incorporated herein by reference thereto. The operating waveforms of the circuits of FIGS. 7 and 9 are shown in FIGS. 8 and 10, respectively.

The circuit of FIG. 7 is designed so that a write timing signal WT 18 operates as an operation control input to a JK flipflop 24 and so that input data 17 obtained on serial/parallel conversion is stored in a distributed fashion in an odd register 27 and in an even register 28. In a readout register selection timing control circuit 33, an output of the JK flipflop 24 is shifted by a readout clock CLK_r 21 to generate three different signals, namely a LEAD 34, representing a lead phase, a NORM 35, representing a reference phase and a LAG 36 representing a lag phase. On power up, a phase detection circuit 26 checks which one of the three phases LEAD, NORM and LAG is the phase of the write timing signal WT 18 or the phase of a readout timing signal RT 20, with a D-flipflop keeping to hold the verified state. Since the transition point between LEAD, NORM and LAG is in a domain where the output of the odd register 27 and that of the even register 28 are stable, the contents of the odd register 27 and the even register 28 can be read out in stability with the readout timing signal RT 20.

Although the FIFO shown in FIG. 9 represents an illustrative application to logical synthesis, the architecture is a example of a routine FIFO. The configuration of FIG. 9 has an internal RAM 45, the addresses for which are generated by a write counter WP 43 and a readout counter RP 44 to effect writing and readout. In the embodiment shown in FIG. 9, FULL 41 and EMPTY 43 are output as status signals for the RAM. The FULL 41 and EMPTY 43 operate for preventing the overflow and the underflow, respectively. Although one clock route is shown in FIG. 9, the basic structure remains unchanged if two clock routes are used each for write and readout.

SUMMARY OF THE DISCLOSURE

The first problem is that, in the circuit shown in the Japanese Patent Kokai Publication JP-A-4-96535, the ride-over timing control is not feasible unless write and readout control signals are input from outside.

The reason is that, if clock ride-over is to be made for the entire pre-ride-over data, the clock ride-over needs to be performed over the entire area, so that it cannot be verified whether or not the phase of the write control signal is close to that of the readout control signal and hence the ride-over timing cannot be controlled.

The second problem is that, if the frequency of the ride-over clock is in the vicinity of the operating threshold of a logic gate circuit, the FIFO constructed by e.g., a memory macro shown in FIG. 10 ceases to be usable.

The reason is that the operating frequency of the memory macro is lower than that of a logic gate circuit. Moreover, the memory macro write/readout address control is in need of a multi-stage counter circuit so that it becomes difficult to improve the operating speed.

It is therefore an object of the present invention to provide a novel clock ride-over circuit and a clock ride-over method whereby clock ride-over (change-over) is rendered feasible even in cases where the clocks before and after ride-over (change-over) contain the jitter and where there is no write and readout control signal input from outside.

According to a first aspect of the present invention, there is provided a clock ride-over circuit in which an input digital signal synchronized with a first clock signal is converted into a digital signal synchronized with a second clock signal, and in which a result of conversion is output as an output digital signal. The clock ride-over circuit includes: (a) a first synchronization circuit matching a phase of an input digital signal to a phase of the first clock signal to output the input digital signal phase-matched to the first clock signal; (b) a selector selecting the input digital signal phase-matched to the first clock signal or an output digital signal of the clock ride-over circuit, depending on a value of a selection signal of the same frequency as that of the first clock signal, to output a selected digital signal as an intermediate digital signal; (c) a second synchronization circuit synchronizing the intermediate digital signal to output the intermediate digital signal synchronized with the second clock signal as the output digital signal, and (d) a timing control circuit generating the selection signal based on the first clock signal and the second clock signal.

In the clock ride-over circuit according to the present invention as described above, the timing control circuit includes a clock detection unit detecting the phase of the first clock signal to output a detected result as a detection signal; a self-running counter outputting the selection signal using the second clock signal as a clock signal; and a phase comparator comparing the phase of the detection signal to that of the selection signal to reset the phase of the self-running counter if the phase difference therebetween is outside an allowable range.

In the clock ride-over circuit according to the present invention as described above, the allowable range begins with a timing at which the first clock signal changes and continues several periods of the second clock signal, with the self-running counter outputting the selection signal at a trailing end of the allowable range after resetting.

According to a second aspect of the present invention, there is provided a clock ride-over method in which an input digital signal synchronized with a first clock signal is converted into a digital signal synchronized with a second clock signal, and in which a result of conversion is output as an output digital signal. The method includes a first step of matching a phase of an input digital signal to a phase of the first clock signal to output the input digital signal phase-matched to the first clock signal, a second step of selecting the input digital signal phase-matched to the first clock signal or an output digital signal of the clock ride-over circuit, depending on a value of a selection signal of the same frequency as that of the first clock signal, to output a selected digital signal as an intermediate digital signal, a third step of synchronizing the intermediate digital signal to output the intermediate digital signal synchronized with the second clock signal as the output digital signal, and a fourth step of generating the selection signal based on the first clock signal and the second clock signal.

In the clock ride-over method according to the present invention, as described above, the fourth step includes a step of detecting the phase of the first clock signal to output a detected result as a detection signal; a step of outputting the selection signal by a self-running counter exploiting the second clock signal as a clock signal; and a step of comparing the phase of the detection signal to that of the selection signal to reset the phase of the self-running counter if the phase difference therebetween is outside an allowable range.

In the clock ride-over method according to the present invention, as described above, the allowable range begins with a timing at which the first clock signal changes and continues several periods of the second clock signal, with the self-running counter outputting the selection signal at a trailing end of the allowable range after resetting.

Operation

According to the present invention, a first clock is detected with a second high-speed clock to compare the detected first clock to a phase comparison signal of a self-running counter running with the second high-speed clock. By setting the width of the phase comparison signal to a width larger than the clock jitter width, it is possible to absorb the jitter to realize clock ride-over (change-over) at an elevated speed. Otherwise caused by the jitter.

PREFERRED EMBODIMENTS OF THE INVENTION

Figure 1:
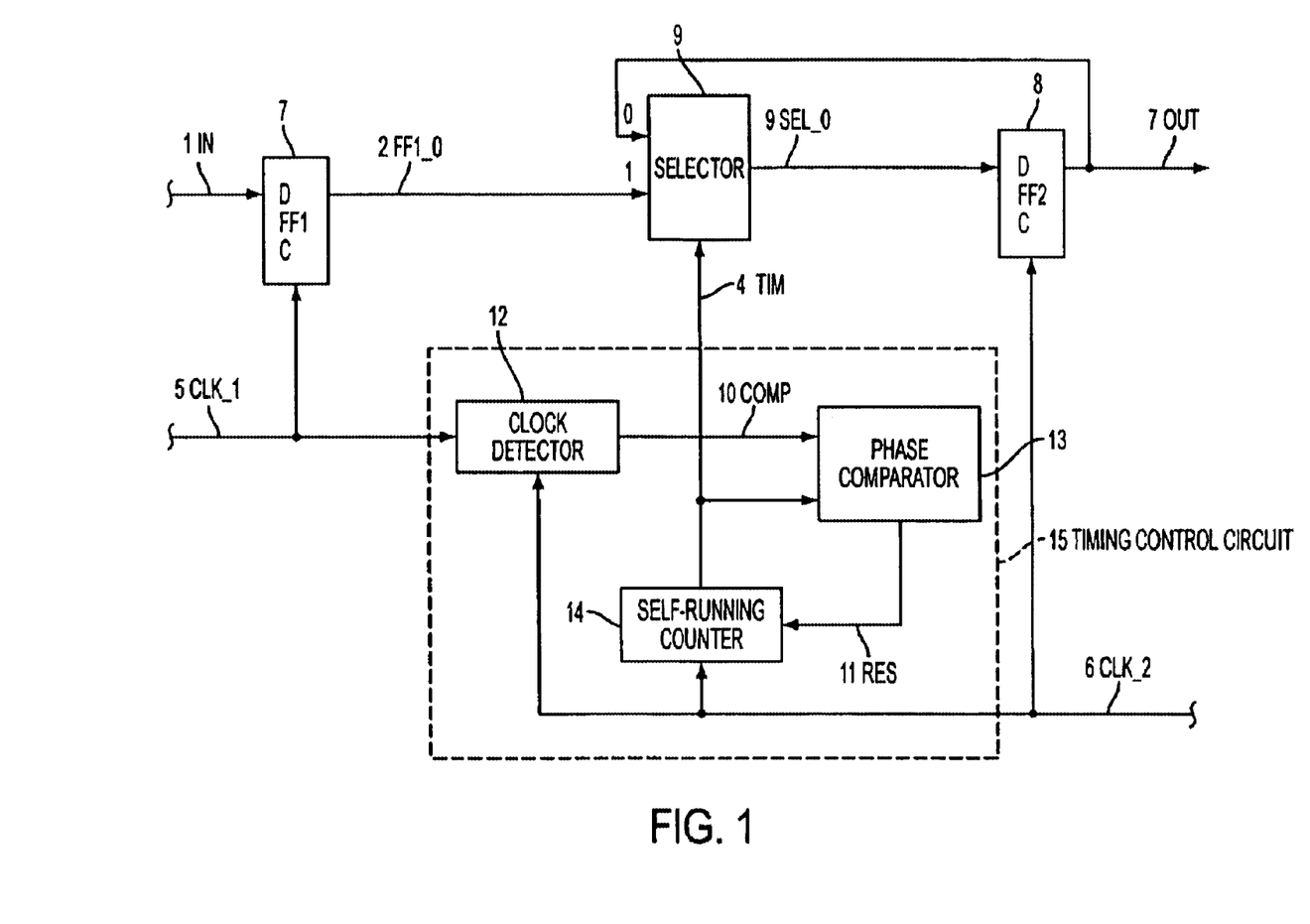
FIG. 1 is a block diagram showing the structure of the clock ride-over circuit embodying the present invention.
Figure 2:
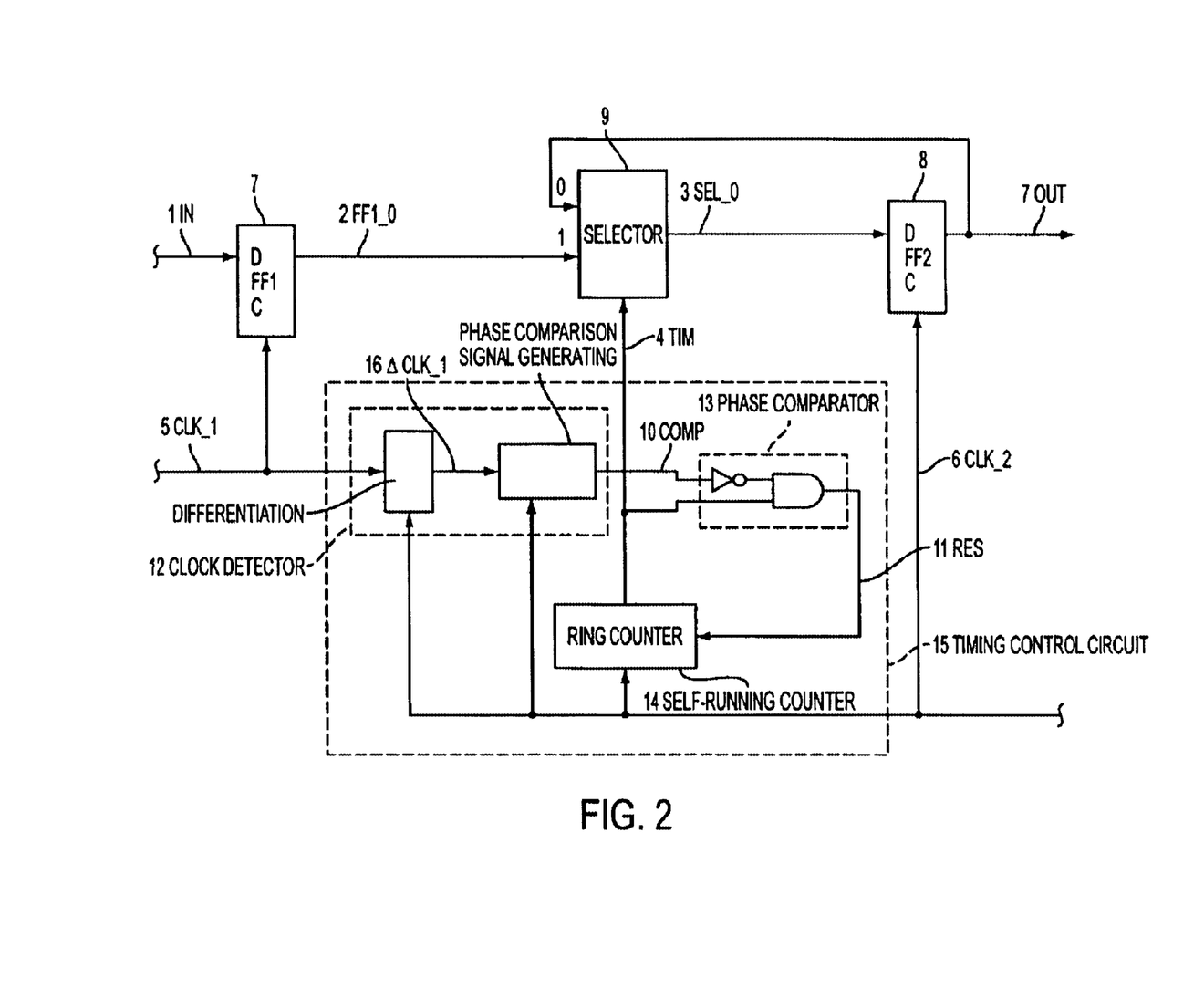
FIG. 2 is a block diagram showing the structure of a clock ride-over circuit according to a first embodiment of the present invention.
Figure 3:
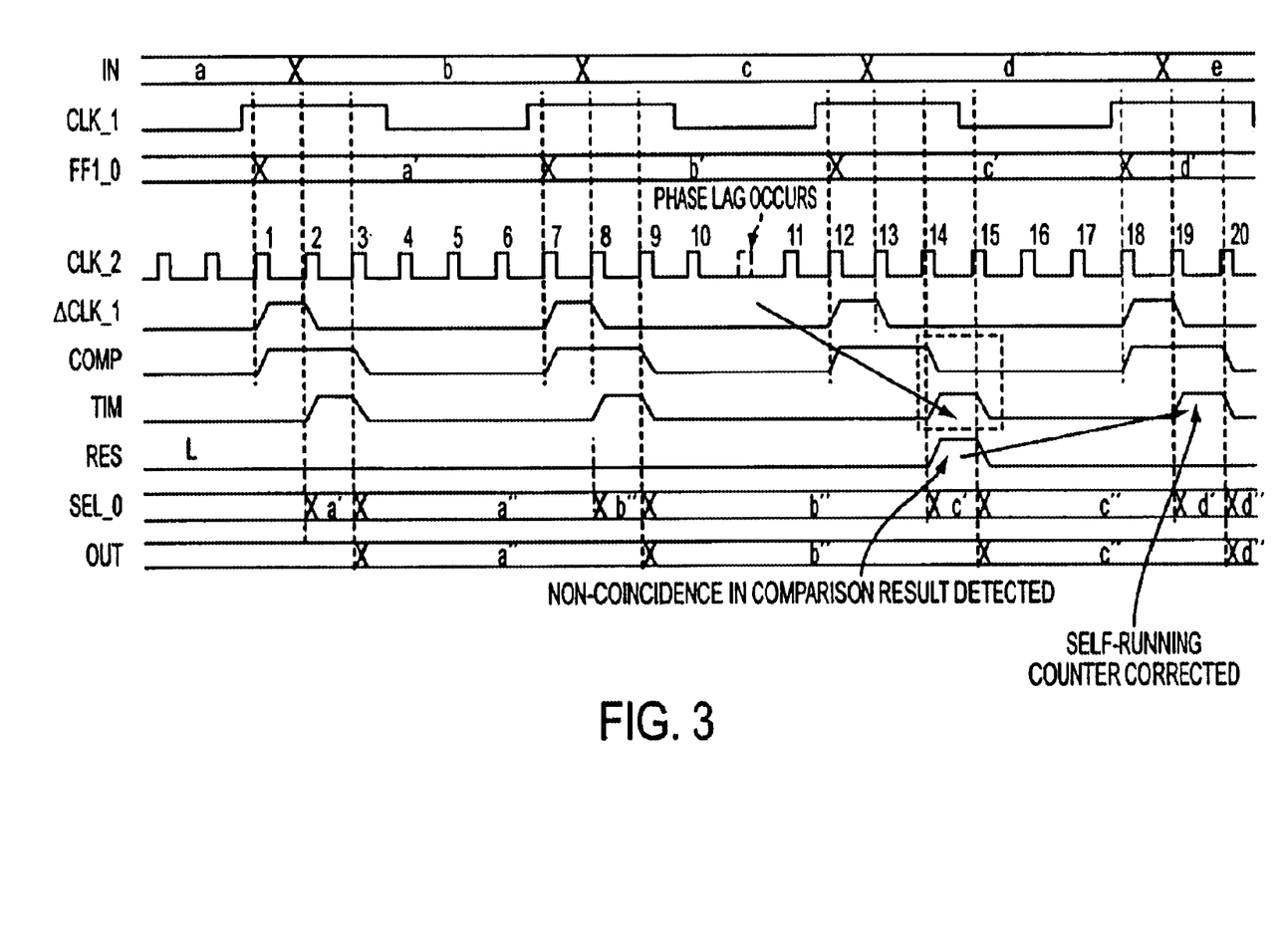
FIG. 3 is a timing chart showing the operation in case of occurrence of phase error of the clock ride-over circuit according to the first embodiment of the present invention.
Figure 4:
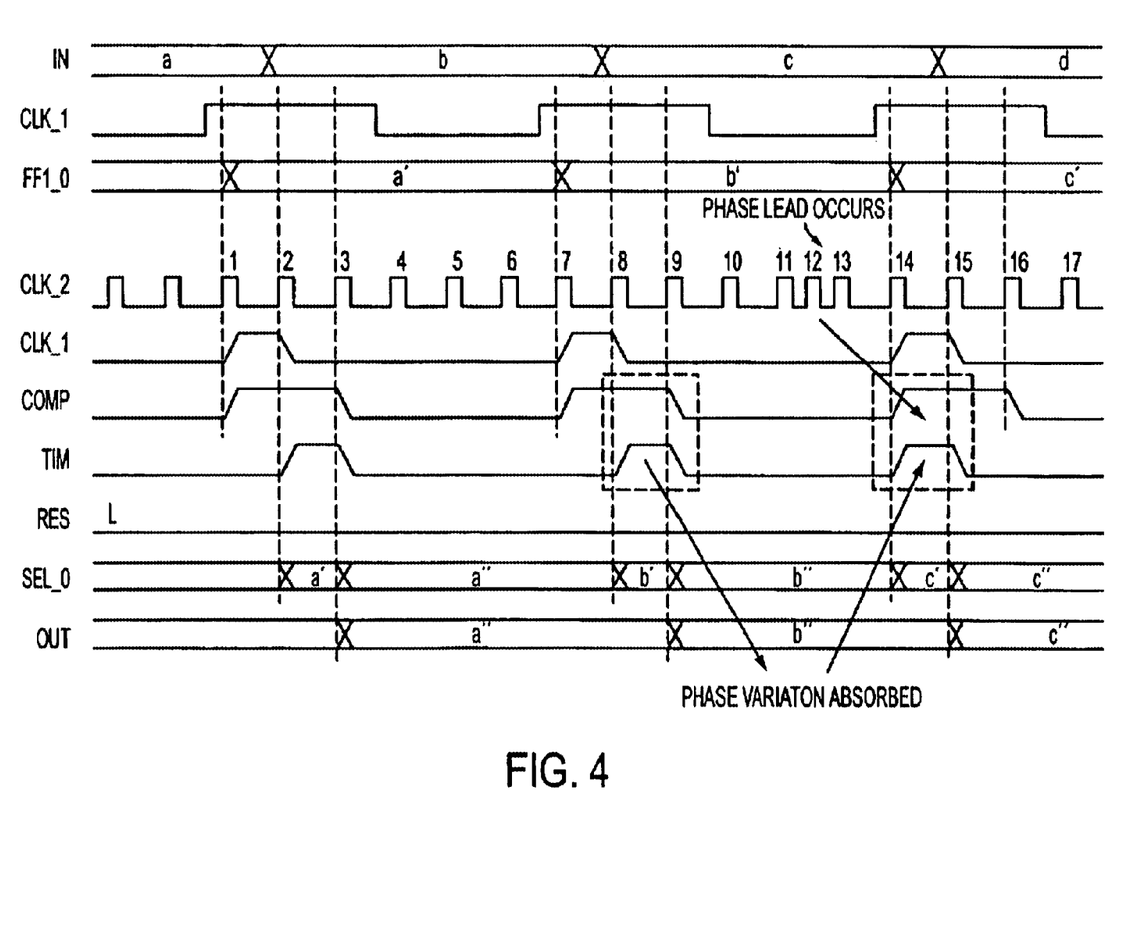
FIG. 4 is another timing chart showing the operation in case of occurrence of phase delay in the clock ride-over circuit according to the first embodiment of the present invention.
Figure 5:
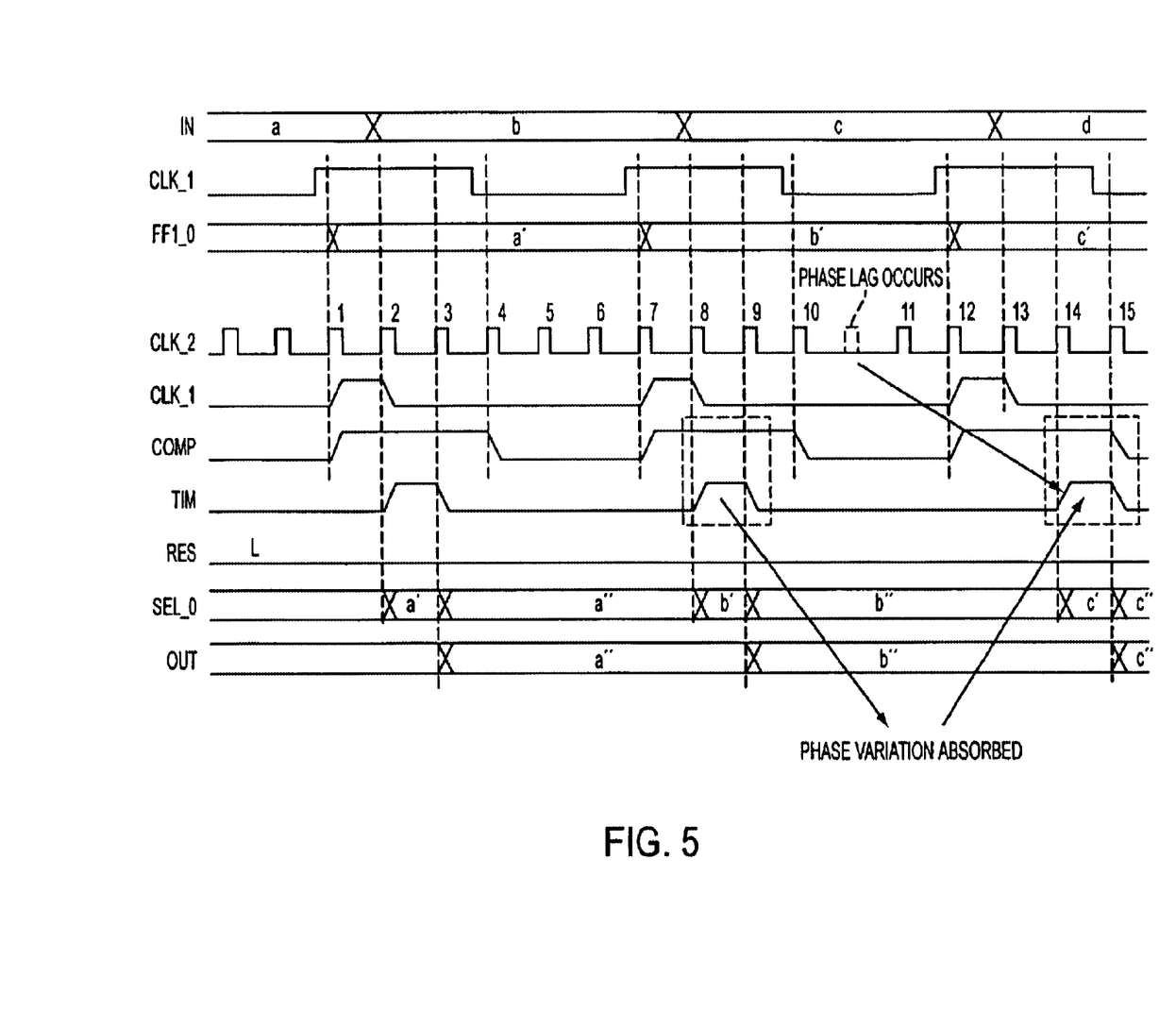
FIG. 5 is a timing chart showing the operation in case of enlarging the phase variation absorbing range of the clock ride-over circuit according to the first embodiment of the present invention.

Referring to the drawings, certain preferred embodiments of the present invention are explained in detail. FIG. 1 shows the principle underlying the present invention and FIG. 2 shows an embodiment of the present invention. FIGS. 3 to 5 show timing charts for FIG. 2.

First, reference is had to FIG. 1, in which an input IN 1 is connected to a D-input of a first D-flipflop FF1 7 operated by a first clock CLK1 5.

A selector 9 has its 1-input connected to an output of the first D-flipflop FF1 7 and has its 0-input connected to a second D-flipflop FF2 8 operating by a second clock CLK_2 6, while having its control input connected to an output of a-self-running counter 14 operating with the second clocks.

The second D-flipflop FF2 8 has its D-input connected to an output of a selector 9.

A clock detector 12, operating at the second clock CLK_2 6, is connected to a first clock CLK_1 5.

A phase comparator 13 has its first input connected to an output COMP 10 of the clock detector 12, while having its second input connected to a timing output TIM 4 of a self-running counter 14 operating at the second clock.

An output 7 of the second D-flipflop FF2 8 represents the output signal of the clock ride-over circuit according to the present invention.

The present invention features phase comparison of the output of the self-running ring counter 14 and the clock detector 12, a method for comparison, and a control method which is based on the result of comparison.

A preferred embodiment is now explained by referring to FIGS. 2 to 5. As an embodiment of the present invention, the frequency of the second clock CLK_2 6 is set to a higher value than the first clock at least several times, e.g., six times that of the first clock CLK_1 5.

Embodiment 1

Reference is first made to FIG. 2 showing an embodiment in which the clock detector 12 explained with reference to FIG. 1 is made up of a differentiating circuit and a phase comparison signal generating circuit, the phase comparator 13 is made up of two logical gates and the self-running counter 14 is constituted by a ring counter.

An input data IN 1 input in synchronism with the first clock CLK_1 5 and re-timed by the first d-flipflop FF1 7. The first clock CLK_1 5 is differentiated by the second clock CLK_2 6 to generate a differentiated output signal ΔCLK_1 16. By an output, timing signal TIM 4 of the ring counter 14, adapted for self-running, the input of the selector 9 is changed over from 0 to 1 at a clock width every six clocks of the second clock CLK_2 6.

Referring to FIG. 3, a mode in which the second clock is within a phase compensation range and resets the self-running ring counter 14 to restore it to the normal state. By way of an example, the phase compensation range is set to a range from a current time point + (plus) one clock until a current time point– (minus) one clock, based on the second clock CLK_2 6. In an embodiment of FIG. 3, the latter half of the H level of the phase comparison signal COMP 10 is coincident with the timing signal TIM 4 up to the ninth clock of the second clock CLK_2 6. Until (before) this time pint, clock ride-over occurs in a regular state. Since the leading half of the H level of the phase comparison signal COMP 10 is vacant until the ninth clock of the second clock CLK_2 6, a range spanning from the current time point until a time point corresponding to one clock ahead in phase is within the phase compensation range. The timing signal TIM 4, output by the self-running ring counter 14, assumes an H-level at a one clock width every six clocks as seen from the second clock CLK_2 6.

If the second clock CLK_2 6 is delayed one clock next to the tenth clock, the output signal TIM 4 of the self-running ring counter 14 is delayed one clock. Since the phase comparison signal COMP 10 is generated by the differentiated (divided) output signal ΔCLK_1 16, a phase comparison result RES 11 outputs the non-coincidence between the first clock CLK_1 5 and the timing output signal TIM 4. By the phase comparison result RES 11 resetting the ring counter 14, the result of non-coincidence is instantly fed back to the self-running ring counter 14 to correct the timing output signal TIM 4 such as to follow the differentiated (divided) output signal ΔCLK_1 16.

Referring to FIG. 4, the phase lead of the current time pont − (minus) one clock is explained. The operation up to the tenth clock of the second clock CLK_2 6 is the same as that in FIG. 3. In the present embodiment, the interval between the 11th second clock CLK_2 6 and the 13 th second clock CLK_2 6 is shortened. Up to the ninth second clock CLK_2 6, the timing output signal TIM 4 is compared to the H level of the latter half of the phase comparison signal COMP 10. By the 12 th second clock CLK_2 6 with a phase lead, the timing output signal TIM 4 comes to be compared to the H level of the former half of the phase comparison signal COMP 10. In this case, the time point at which comparison of the timing signal COMP 10 to the phase comparison signal COMP is made varies, however, the phase lead is absorbed.

FIG. 5 shows an embodiment in which the phase comparison signal COMP has a width of three clocks, with the phase compensation range of the second clock CLK_2 being the current time point ± one clock. Although the phase delay occurs next to the tenth clock, as in FIG. 3, phase variations are absorbed.

Second Embodiment

Figure 6:
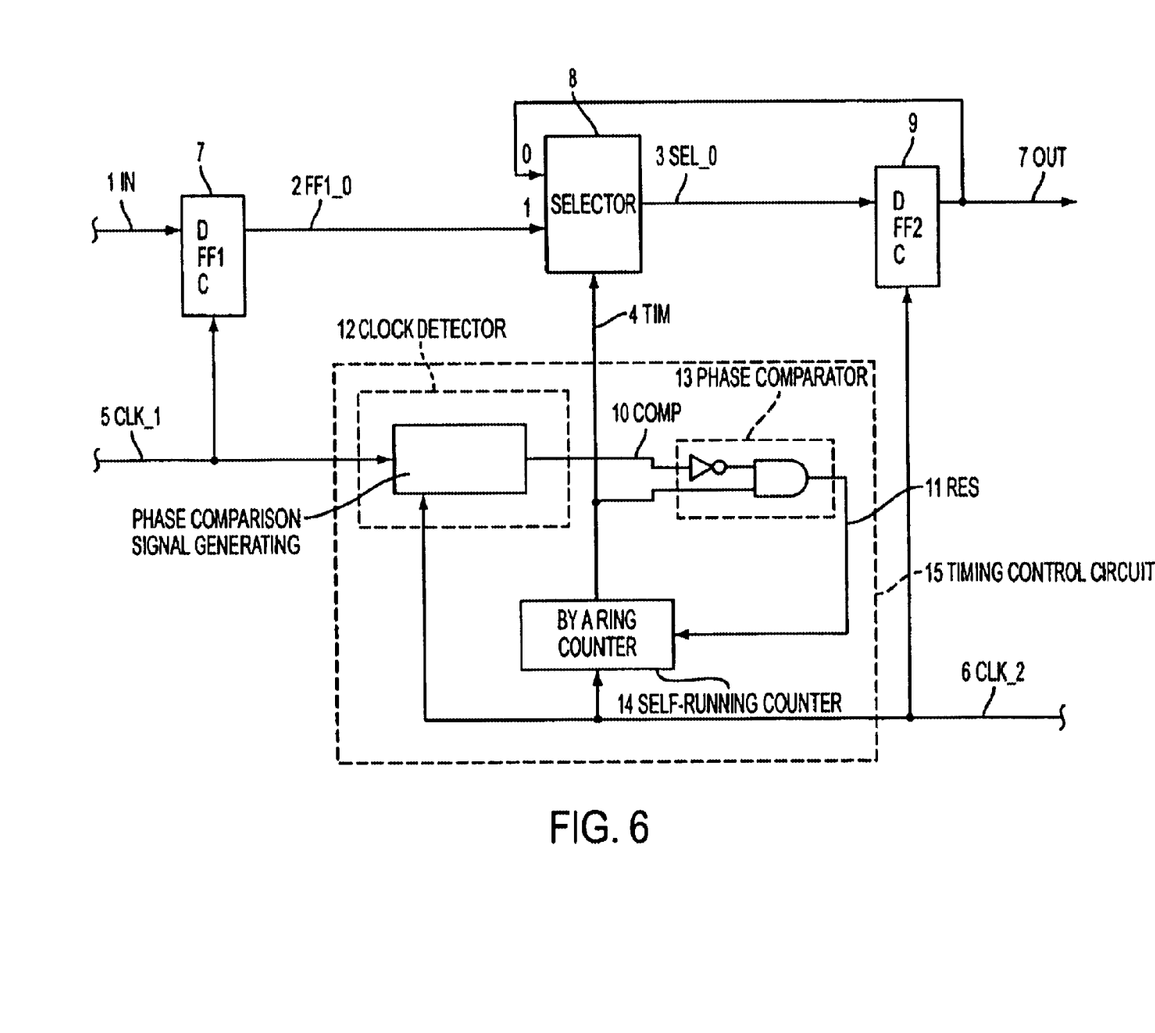
FIG. 6 is a block diagram showing the structure of the clock ride-over circuit according to the first embodiment of the present invention.

FIG. 6 shows a second embodiment in which the first d-flipflop FF1 7, selector 9 and the second D-flipflop FF2 8 are each made up of plural devices, respectively (details not shown), the differentiating circuit is deleted from the first embodiment and in which the self-running counter 14 is changed to a binary counter. In the present embodiment, clock ride-over is feasible at a time in case of input data made up of plural bits. If there is no differentiating circuit upstream of the phase compensation circuit, the phase comparison signal COMP 10 can be generated easily by constructing the phase compensation circuit by e.g., a shift register. The self-running counter 14 is preferably constituted by a ring counter or other counter, or by a state machine, insofar as the operating speed is concerned. If the ring counter or a Johnson counter is used, a booby trap is indispensable in order to prevent stacks.

The meritorious effects of the present invention are summarized as follows.

The present invention, as described above, gives the following meritorious effect.

The first effect is that clock ride-over is feasible in the absence of an input of the write/readout control signal from outside.

The reason is that clocks prior to ride-over are detected by clocks occurring subsequent to ride-over.

The second effect is that clock ride-over is feasible even if the read-out clocks contain jitter.

The reason is that the clocks prior to ride-over are detected by clocks subsequent to ride-over, a phase comparison signal COMP having a pulse width longer than the period of jitter contained in the ride-over clock, the phase comparison signal COMP is phase-compared to the timing signal TIM, self-running at the post-ride-over clocks and generating one clock width at a period prior to ride-over, and the timing signal TIM is reset by the result of the phase comparison to evade timing errors.

What is claimed is:

1. A clock ride-over circuit in which an input digital signal synchronized with a first clock signal is converted into a digital signal synchronized with a second clock signal, and in which a result of conversion is output as an output digital signal, comprising:

(a) a first synchronization circuit matching a phase of an input digital signal to a phase of said first clock signal to output said input digital signal phase-matched to said first clock signal;

(b) a selector selecting said input digital signal phase-matched to said first clock signal or an output digital signal of the clock ride-over circuit, depending on a value of a selection signal of the same frequency as that of said first clock signal, to output a selected digital signal as an intermediate digital signal;

(c) a second synchronization circuit synchronizing said intermediate digital signal to output said intermediate digital signal synchronized with said second clock signal as said output digital signal; and (d) a timing control circuit generating said selection signal based on said first clock signal and said second clock signal.

2. The clock ride-over circuit as defined in claim 1 wherein said timing control circuit comprises:

(d1) a clock detection unit detecting the phase of the first clock signal to output a detected result as a detection signal;

(d2) a self-running counter outputting said selection signal using said second clock signal as a clock signal; and (d3) a phase comparator comparing the phase of said detection signal to that of said selection signal to reset the phase of said self-running counter if the phase difference therebetween is outside an allowable range.

3. The clock ride-over circuit as defined in claim 2 wherein said allowable range begins with a timing at which said first clock signal changes and continues a plurality of periods of said second clock signal, said self-running counter outputting said selection signal at a trailing end of said allowable range after resetting.

4. The clock ride-over circuit as defined in claim 1, wherein said second clock signal has a higher speed than said first clock signal.

5. The clock ride-over circuit as defined in claim 3, wherein said plurality of periods include at least 2 or 3 periods of said second clock signal.

6. The clock ride-over circuit as defined in claim 1 said output signal of the clock ride-over circuit is fed back to one input of said selector.

7. The clock ride-over circuit as defined in claim 2, wherein said clock detection unit comprises:

a differentiating unit of the first clock signal using the second clock signal having a higher speed than the first clock signal, to output a differentiated clock signal of the first clock signal, which is used for generating a phase comparison signal supplied to said phase comparator.

8. A clock ride-over method in which an input digital signal synchronized with a first clock signal is converted into a digital signal synchronized with a second clock signal, and in which a result of conversion is output as an output digital signal, comprising:

(a) a first step of matching a phase of an input digital signal to a phase of said first clock signal to output said input digital signal phase-matched to said first clock signal;

(b) a second step of selecting said input digital signal phase-matched to said first clock signal or an output digital signal of the clock ride-over circuit, depending on a value of a selection signal of the same frequency as that of said first clock signal, to output a selected digital signal as an intermediate digital signal;

(c) a third step of synchronizing said intermediate digital signal to output said intermediate digital signal synchronized with said second clock signal as said output digital signal; and (d) a fourth step of generating said selection signal based on said first clock signal and said second clock signal.

9. The clock ride-over method as defined in claim 8 wherein said fourth step comprises:

(d1) a step of detecting the phase of the first clock signal to output a detected result as a detection signal;

(d2) a step of outputting said selection signal by a self-running counter which uses said second clock signal as a clock signal ; and (d3) a step of comparing the phase of said detection signal to that of said selection signal to reset the phase of said self-running counter if the phase difference therebetween is outside an allowable range.

10. The clock ride-over method as defined in claim 9 wherein said allowable range begins with a timing at which said first clock signal changes and continues several periods of said second clock signal, said self-running counter outputting said selection signal at a trailing end of said allowable range after resetting.

* * * * *